(12) United States Patent
Poon

(10) Patent No.: US 12,316,228 B2
(45) Date of Patent: May 27, 2025

(54) POWER SWITCHING APPARATUS AND POWER SUPPLIES

(71) Applicant: Empower Electronic Limited, Hong Kong (CN)

(72) Inventor: Ngai Kit Franki Poon, Hong Kong (CN)

(73) Assignee: Empower Electronic Limited, Hong Kong (CN)

( * ) Notice: Subject to any disclaimer, the term of this patent is extended or adjusted under 35 U.S.C. 154(b) by 451 days.

(21) Appl. No.: 17/779,145

(22) PCT Filed: Sep. 24, 2020

(86) PCT No.: PCT/IB2020/058918
§ 371 (c)(1),
(2) Date: May 24, 2022

(87) PCT Pub. No.: WO2021/059174
PCT Pub. Date: Apr. 1, 2021

(65) Prior Publication Data
US 2023/0344355 A1    Oct. 26, 2023

(30) Foreign Application Priority Data
Sep. 24, 2019  (HK) .................. 19130091.2

(51) Int. Cl.
*H02M 3/335* (2006.01)
*H02M 1/00* (2007.01)
*H02M 3/158* (2006.01)

(52) U.S. Cl.
CPC ..... *H02M 3/33523* (2013.01); *H02M 1/0006* (2021.05); *H02M 1/0035* (2021.05); *H02M 3/1582* (2013.01); *H02M 3/33553* (2013.01)

(58) Field of Classification Search
CPC ............ H02M 1/0006; H02M 1/0032; H02M 1/0035; H02M 3/07; H02M 3/156;
(Continued)

(56) References Cited

U.S. PATENT DOCUMENTS

2005/0174811 A1* 8/2005 Liu .................. H02M 3/33592
363/21.01
2008/0043504 A1   2/2008 Ye et al.
(Continued)

FOREIGN PATENT DOCUMENTS

| CN | 201430537 Y | 3/2010 |
| CN | 103208934 A | 7/2013 |
| CN | 107276432 A | 10/2017 |

OTHER PUBLICATIONS

International Search Report of PCT Patent Application No. PCT/IB2020/058918 issued on Jan. 21, 2021.

*Primary Examiner* — Thienvu V Tran
*Assistant Examiner* — Shahzeb K Ahmad

(57) ABSTRACT

A power switching apparatus (P100) for a switching-mode power supply is provided. The switching apparatus (P100) comprises a power switch (M100), a switching controller (SC100), a voltage converter (Ra100) and a power capacitor (Csc100). The power switch (M100) is configured for connection with a power input device to form a power supply circuit to receive power from a power source. The switching controller (SC100) is operable to turn on or turn off the power switch (M100). When the power switch (M100) is turned on, power is to flow from the power source into the power input device. When the power switch (M100) is turned off, power is to stop flowing from the power source into the power input device. The voltage converter (Ra100) is configured to receive power from the power source when the power switch (M100) is turned on and to output a regulated voltage.

20 Claims, 7 Drawing Sheets

Figure 1:
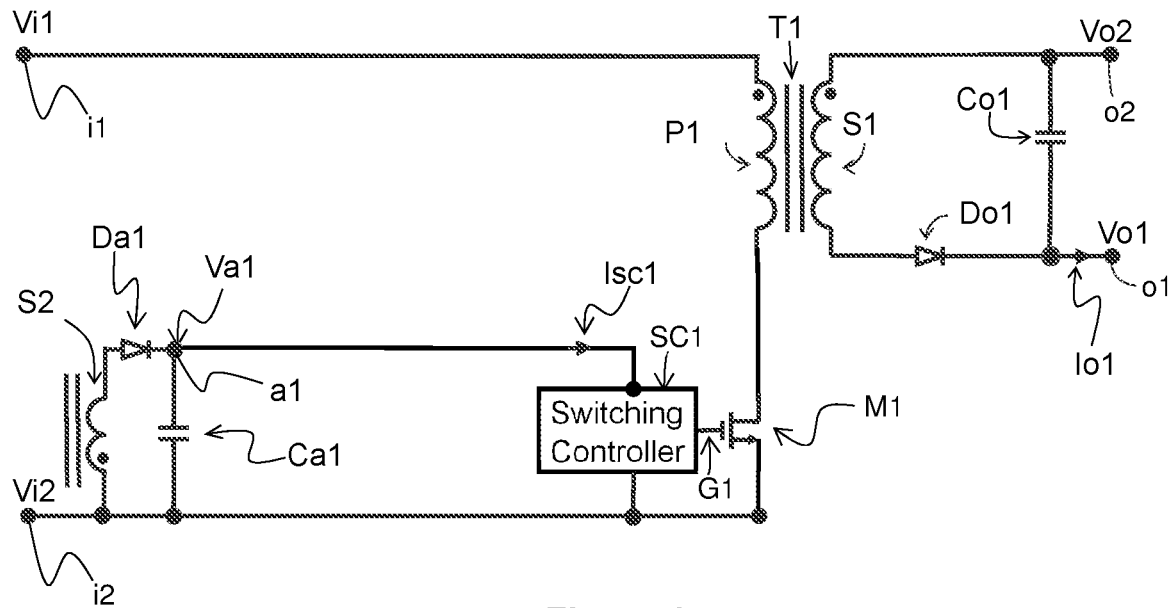

(58) Field of Classification Search
CPC .......... H02M 3/335; H02M 3/33507; H02M 3/33523; H02M 3/3353; H02M 3/33538; H02M 3/33553; H02M 3/33561; H02M 3/33569

See application file for complete search history.

(56) References Cited

U.S. PATENT DOCUMENTS

| | | | | |
|---|---|---|---|---|
| 2013/0250627 | A1* | 9/2013 | Herfurth | H02M 3/3376 363/21.15 |
| 2015/0280585 | A1 | 10/2015 | Hayakawa et al. | |
| 2018/0226894 | A1* | 8/2018 | Teo | H02M 1/08 |
| 2019/0222138 | A1* | 7/2019 | Strijker | H02M 1/36 |

* cited by examiner

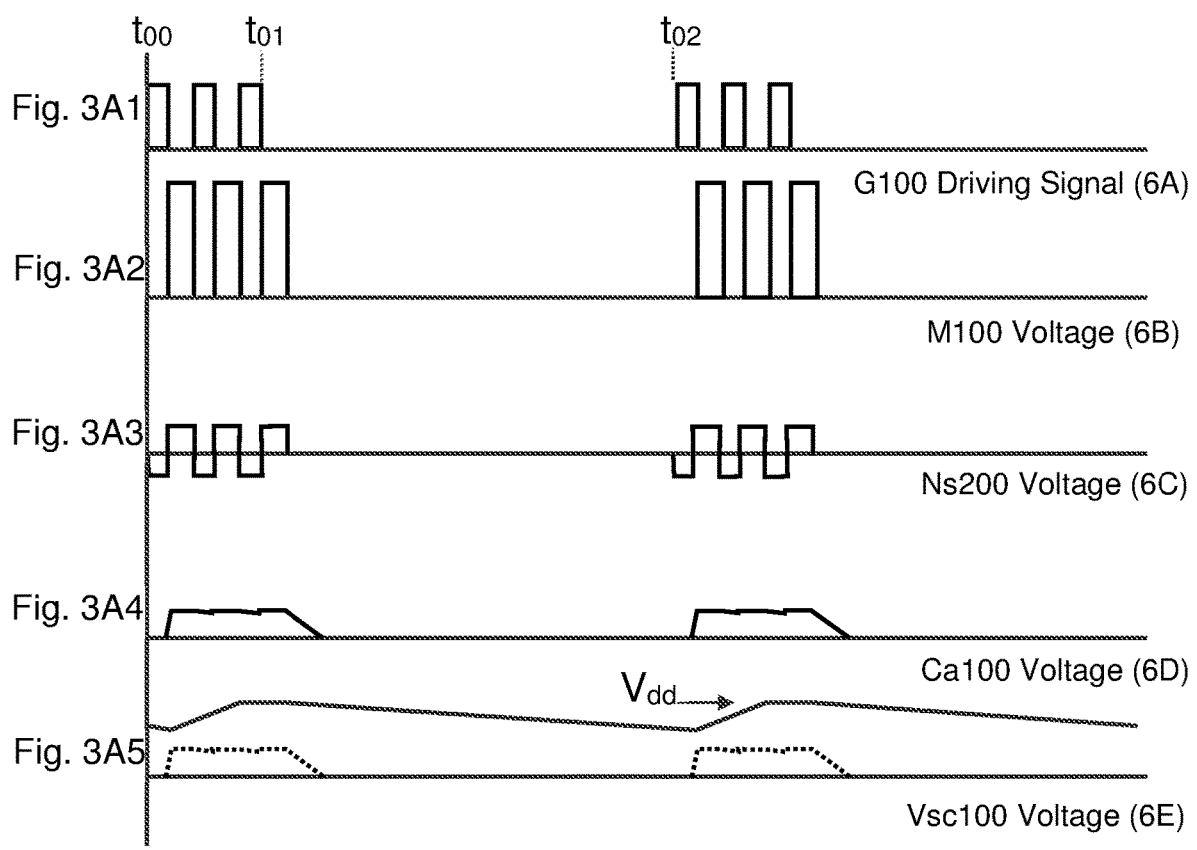

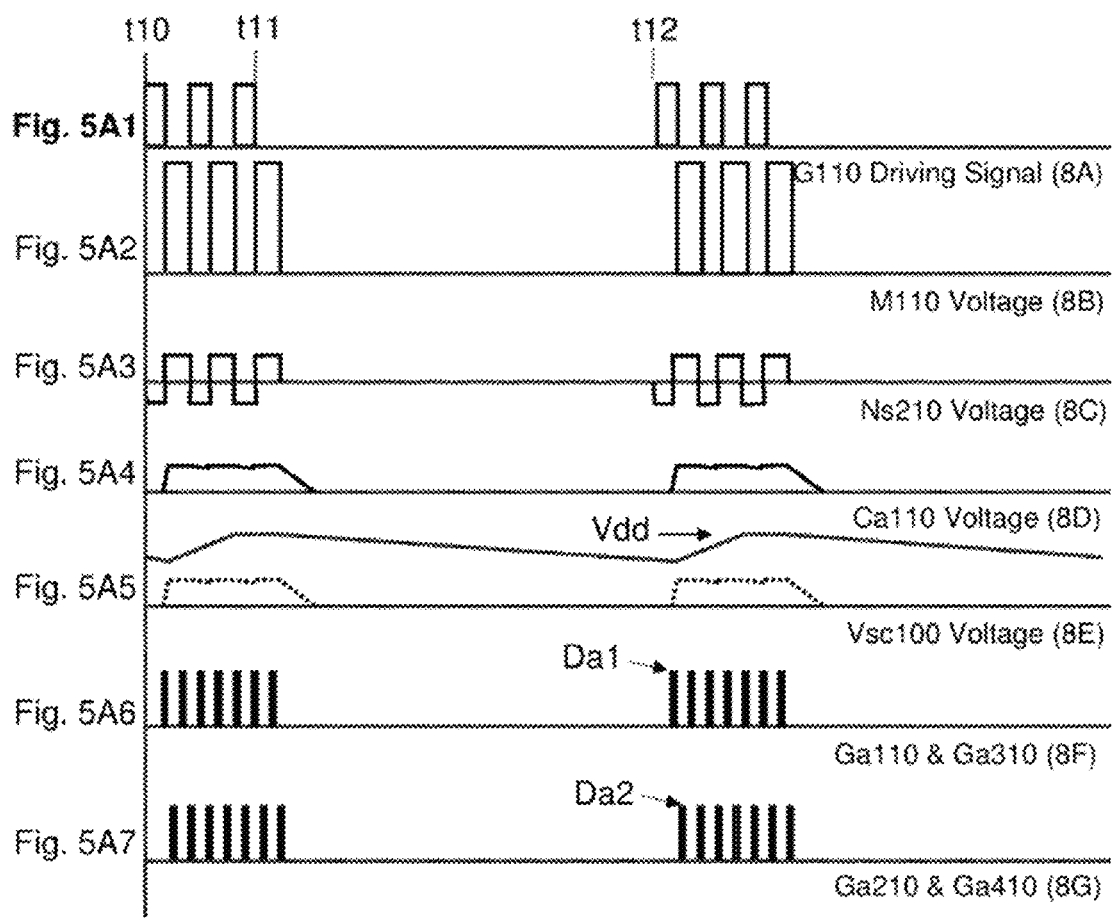

POWER SWITCHING APPARATUS AND POWER SUPPLIES

FIELD

The present disclosure relates to power supplies and power switching apparatus of power supplies. More particularly, this disclosure relates to switched-mode power supplies and power switching apparatus of switched-mode power supplies.

BACKGROUND

Power supply apparatuses incorporating a power switching apparatus are widely used for supplying operational electrical power to electronic appliances, especially appliances which require a DC (direct current) power supply such as mobile phone chargers and computer-based appliances. Typical power switching apparatus during power conversion operations are to convert an input power of a first base frequency to an output power of a second and higher frequency.

Power supply apparatuses incorporating power switching apparatus are frequently configured as switching-mode power supplies. A switching-mode power supply ("SMPS") is an apparatus comprising at least a switching controller which consumes stand-by power during stand-by conditions when no load is delivered. To mitigate power loss of SMPS during stand-by, many switching controllers such as PWM controllers are operable in a "burst mode" and are configured to operate in the burst mode during stand-by or no-load conditions.

Burst-mode operation is a mode of operation in which the switching controller of a power supply apparatus, for example the power supply control circuit, and the switching circuit is temporarily disabled when no load current is delivered on the output side of the power supply apparatus when the power supply apparatus is connected to an active power source. A switching controller operable in the burst mode operates in association with a power supply feedback circuit to monitor load current. When the load current at the output is below a threshold current, the switching controller will enter into burst mode operations. The threshold current may be a pre-determined output current or a predetermined percentage of the rated output current $I_o$. In example controllers, the threshold current may be set at, for example, 100 uA or n % of $I_o$, where n can be 0.1, 0.5, 1, 1.5, 2 etc. without loss of generality. The burst mode is also known as pulse skipping mode and $I_o$ is the rated or maximum output current.

When the switching controller operates in the burst mode, the power supply is disabled for a period of off-time (for example, several milliseconds) and will be enabled again for a period of on-time when the output voltage drops to a threshold voltage. By periodically disabling the main circuits of the power supply at very-low-load or no-load conditions, the power supply is able to consume much less power in order to meet no-load power consumption requirements, for example the 210 mW requirements imposed by the efficiency guidelines of the US Department of Energy (DOE) which came into effect in 2016.

When operating in the burst mode, the power supply is to charge up a power capacitor during the on-time period so that the power capacitor can supply operating power to the switching controller during the off-time period. The off-time of the burst mode is substantially longer than the on-time so that the power saving can be meaningful. However, a longer off-time means a larger capacitor is required in order that the power capacitor can be fully or adequately charged during the shorter on-time. A larger capacitor typically means a more bulkier power supply which is not desirable where miniaturization is desirable.

Many power supplies are designed to cater for variable output voltages, so that appliances having different input voltage requirements can connect to the power supply to obtain operational power. For example, an example external power supply is for supplying a variable output voltage between 3.3V and 20V. As another example, the USB PD (power deliver) 3.0 standard requires variable voltage outages at discrete voltage levels of 5V, 9V, 15V and 20V.

DISCLOSURE

A power switching apparatus for a switching-mode power supply is disclosed. The switching apparatus comprises a power switch, a switching controller, a voltage converter and a power capacitor. The power switch is configured for connection with a power input device to form a power supply circuit to receive power from a power source. The switching controller is operable to turn on or turn off the power switch. When the power switch is turned on, power is to flow from the power source into the power input device. When the power switch is turned off, power is to stop flowing from the power source into the power input device. The voltage converter is configured to receive power from the power source when the power switch is turned on and to output a regulated voltage. The power capacitor is configured to be charged by the regulated voltage of the voltage converter when the power switch is turned on. The power capacitor is configured to discharge to provide power for operation of the switching controller when the power switch is turned off.

With the power capacitor so arranged, a power capacitor and a switching controller having a low voltage rating can be used compared to conventional arrangements.

The power input device may be a primary winding of a power transformer. The power transformer comprises an auxiliary winding which is configured to supply operation power to the switching controller during power switching operations when operational power is supplied to a load connected to the power supply.

The voltage converter may be configured for variable voltage input.

The switching controller comprises a power input node, the power capacitor comprises a positive terminal, and the switching controller and the power capacitor are connected in parallel with the power input node and the positive terminal electrical interconnected.

The regulated voltage output, the power input node and the positive terminal of the capacitor may be connected at a common node and at same electrical potential.

The switching controller is configured to be operable in a burst mode during which the switching controller is to operate in an on-period and an off-period which is longer than the on-period is in abutment therewith.

The switching controller is configured to receive operation power from the power supply circuit and to transmit a train of switching signals comprising a plurality of alternately disposed on-signals and off-signals to the power switch during the on-period. The switching controller is configured to stop transmitting on-signals to the power switch during the off-period.

The switching controller is configured to receive operation power from the power capacitor through or by discharge of the power capacitor. The operation power from or delivered by the power capacitor is due to charging of the power capacitor by the power source during the on-period.

An example SMPS as shown in FIG. 1 comprises a power supply circuit, a power switching circuit and an output circuit. The SMPS has a power input side comprising a first power-input node $i_1$ and a second power-input node $i_2$. The SMPS has a power output side comprising a first power-output node $o_1$ which is at a first voltage $V_{o1}$ and a second power-output node $o_2$ which is at second voltage $V_{o2}$.

The example power supply circuit comprises a first winding P1, a second winding S1, and a third winding S2 which cooperate to form a transformer T1. The first winding is a primary winding which is configured as an input winding for connection to a power source, for example a DC power source. The second winding is a secondary winding which is magnetically coupled to the first winding and configured as an output winding for outputting switched power output of the SMPS to a power output side. The power output side comprises an output circuit which is connected to the output winding. The third winding is another secondary winding which is configured as an auxiliary winding for supplying operation power to the power switching circuit. The third winding is magnetically coupled to the first winding and/or the second winding to obtain auxiliary power therefrom. The power input nodes $i_1$ and $i_2$ of the SMPS are configured for connection to a power source to receive operation power of the SMPS. The power source is referred to as the main power source to distinguish from the auxiliary power source which is a power source configured for operating the power switching circuit and having its power derived or originated from the main power source. In the example embodiment, the first power-input node $i_1$ is a terminal which is connected to a first supply terminal of the power source and is at a first voltage of $V_{i1}$, and the second power-input node $i_2$ is a terminal which is connected to a second supply terminal of the power source and is at a second voltage of $V_{i2}$, where $V_{i1} > V_{i2}$.

The power switching circuit comprises a switching controller SC1 and a power switch M1.

The power switch M1 is a three terminal switch comprising a first terminal, a second terminal which cooperates with the first terminal to define a switchable electrical path, and a third terminal which is a control terminal G. The power switch and its switchable electrical path is switchable between an on-state and an off-state. When the power switch is in the on-state, the switchable electrical path has a very low-impedance and is a low-loss electrical current path resembling an electrical conductor of a very low resistance. When the power switch is in the off-state, the switchable electrical path has a very high-impedance and is a high loss electrical link resembling an electrical insulator of a very high resistance. When an on-state control signal is applied to the control terminal, the power switch is on the on-state. When an off-state control signal is applied to the control terminal, the power switch is on the off-state. The control terminal and the switchable electrical path of typical power switches, especially semiconductor power switches, are usually electrically insulated from each other. For example, the switchable electrical path and the control terminal of a power MOSFET as a common example of semiconductor power switches are insulated from each other, and switching of the power switch between the operation states, namely, the on-state and the off-state is by application of a switching electrical field at the control terminal, which is a gate terminal in the example of a power MOSFET. The terms electrical path and electrical link are used interchangeably herein unless the context requires otherwise. A semiconductor switch such as a transistor switch including a MOSFET switch is widely used for SMPS due to its high switching frequency and bandwidth.

The switching controller SC1 is configured to generate a train of switching pulses to repeatedly switch the power supply circuit alternately between an on-state and an off-state during power switching operations. When the power supply circuit is in the on-state, power available from the power source is coupled to the output winding or the auxiliary winding. When the power supply circuit is in the off-state, power available from the power source is not coupled to the output winding or the auxiliary winding. As shown in FIG. 1, the control terminal of the power switch M1 is connected to a switching signal output node of the switching controller SC1 and the switchable electrical path of the power switch M1 is in series connection with the primary winding P1. The series connection comprising the primary winding P1 and the power switch M1 is connected to the power input nodes to form an input current loop. The switching controller is configured to generate and transmit a train of switching signals to the power switch during power switching operations. More specifically, the switching controller is to generate and transmit a train of switching signals to switch the semiconductor power switch repeatedly and alternately between an on-state and an off-state during operation.

The switching signals may comprise alternately disposed on-signals and off-signals such that an on-signal immediately follows an off-signal and an off-signal immediately follows an on-signal. A control signal is typically a switching pulse having a sharp leading edge and a sharp trailing edge so that there is a very short transition time between adjacent control signals of opposite states. A leading edge may be a rising edge or a falling edge The switching signals as example control signals are to switch the power switch M1 between alternative states, that is, from an on-state to an off-state and vice versa. The switching signals are typically switching pulses, usually square pulses primarily due to ease of generation. A typical train of switching signals typically comprises on-pulses and off-pulses. A typical on-pulse has a rise edge having a rise-time, a fall edge having a fall-time, and pulse time defined by the rise edge and the fall edge in cooperation. An on-pulse has a rising edge having a rise-time, a falling edge having a fall-time, and a pulse time during which the on-pulse has an on-voltage. An on-pulse has a falling edge having a fall-time, a rising edge having a rise-time, and a pulse time during which the off-pulse has an off-voltage. The rise-time and the fall-time of a control pulse is a transition time. A transition time herein is the time of transition between an on-state and an immediately following off state of a power switch and vice versa. An example rise-time is the transition time between end of an off-state voltage and beginning of next on-state voltage. An example fall-time is the transition time between end of an on-state voltage and beginning of next off-state voltage. A typical on-pulse has a negligible rise-time, a negligible fall-time and an on-state voltage between the rising edge and the falling edge. A typical off-pulse has a negligible fall-time, a negligible rise-time, and an off-state voltage between the rising edge and the falling edge. A transition time is negligible if its duration is substantially smaller than the pulse time, for example, at 1%, 0.5%, 0.1%, 0.05% or less. The pulse-time of a square pulse is equal to the time difference between its leading edge and its trailing edge. A leading edge and also a trailing edge can be a rising edge or a falling edge without loss of generality.

In examples where an off-pulse has a zero or near zero off-state voltage, the leading edge and the trailing edge of the off-pulse may not be noticeable. In such a case, the pulse time of an off pulse can be determined by the time difference between the proximal transitional edge of an immediately preceding on-pulse and the proximal transitional edge of an immediately following on-pulse.

The power switch M1 is connected to the primary winding P1 such that when the power switch is in the on-state during power conversion operations when the SMPS is connected to the main power source, the primary winding P1 and the main power source are electrically connected by a very low impedance electrical link formed by the power switch, the very low impedance electrical link being equivalent to a highly conductive electrical conductor. When the primary winding P1 and the power source are electrically connected by a very low impedance electrical link resembling an electrical conductor, operational electrical current will flow from the power source to the power supply circuit substantially unimpeded, that is, with no or minimal voltage drop across the electrical link or no or minimal power loss due to resistance of the electrical link. The power supply circuit comprises the power source, the primary winding and the power switch which are connected in series to form a circuit loop.

When the power switch is in the off-state during power conversion operations when the SMPS is connected to the main power source, the primary winding and the power source are electrically disconnected by a very high impedance electrical link formed by the switch, the very high impedance electrical link being equivalent to a non-conductive electrical insulator. When the primary winding and the power source are electrically connected by a very high impedance electrical link defined by the power switch, operational electrical current cannot effectively flow from the power source to the power supply circuit and the flow of electrical current from the power source to the primary winding is impeded by the high impedance electrically link interconnecting the power source and the primary winding in series.

The power switching circuit of FIG. 1 comprises a power capacitor $C_a1$. The power capacitor $C_a1$ is configured as a power storage device which to supply operation power to the switching controller SC1 during the off-time period when the switching controller SC1 is operating in the burst mode. The power capacitor $C_a1$ has a secondary effect of smoothing supply power to the switching controller SC1. The power capacitor $C_a1$ and the switching controller SC1 are in parallel connection and the parallel connection comprises a first common node at node a1 and a second common node at node i 2.

The example power switching circuit comprises a diode Da1. The diode is configured as a one-way current device to limit flow of electrical power current in only one direction, which is the forward direction of the diode, and to impede flow of current in the reverse direction which is opposite to the forward direction. When electrical power flows through the diode in the forward direction, the electrical power is to flow towards the power capacitor $C_a1$ and the switching controller SC1. When electrical power flow in the forward direction, the power capacitor $C_a1$ will be charged and the switching controller SC1 will be powered to operate.

During power switching operations when the SMPS is connected to a power source, an auxiliary voltage $V_a1$ will appear at a power input node a1 of the power switching circuit. The auxiliary voltage $V_a1$ is the supply voltage to the power capacitor $C_a1$ and also the supply voltage to the switching controller SC1.

The auxiliary voltage $V_a1$ is related to the output voltage $V_o$ of the secondary winding S1 (which is configured as an output winding) by a ratio which is approximately equal to the turn ratio between the output winding and the auxiliary winding. The voltage relationship when expressed in equation form is $$V_a1 \cong V_o \frac{N_a}{N_s}, \text{ where } \frac{N_a}{N_s} = N_r$$

is a turn ratio between the number of turns of the auxiliary winding and the number of turns of the output winding, where $N_s$ is the number of turns of the output winding and $N_a$ is the number of turns of the auxiliary winding.

The output current $I_o1$ of the power supply is dependent on the load which is connected to the output circuit. The load current would be at a minimum when no load is connected to the output circuit or when a load connected to the output circuit does not draw current from the output circuit. The minimum load current is also known as no-load current which for most practical purposes is regarded as "zero current". The no-load current of a typical SMPS is typically at or below 100 uA. The output current during typical power supply operations is typically many times more than the auxiliary current $I_{sc}1$ which flows into the switching controller SC1.

For an ideal transformer, the output voltage of an output winding and the auxiliary voltage of an auxiliary winding which is magnetically coupled to the output winding are always related by a constant k which relates to the turns-ratio between the output winding and the auxiliary winding. Where the output voltage of an output winding of a transformer varies between a first, lower, output voltage $V_{o1}$ and a second, higher, output voltage $V_{o2}=V_r V_{o1}$, where $V_r$ is a voltage ratio between the higher voltage and the lower voltage, the auxiliary voltage at the auxiliary winding of an ideal transform is expected to vary between $V_{a1}$ and $V_{a2}$, where $V_{o1}=kV_{a1}$ and $V_{o2}=kV_{a2}$. However, the windings of practical power transformers such as the example transformer of FIG. 1 comprising the first, second and third windings are not perfectly coupled, and parasitic components are present and inevitable. The parasitic components of the power transformer may cause voltage spikes and the auxiliary voltage $V_{a1}$ can reach a maximum of two times the ideal or theoretical maximum.

In the example transformer of FIG. 1, when load current on the output side changes, the auxiliary winding voltage $V_a$ on the auxiliary winding also changes. However, while the auxiliary winding voltage $V_a$ follows the change of the load current so that when the load current increases, the auxiliary voltage $V_a$ also increases and vice versa, the relationship or change is not linear. For practical design considerations, the maximum auxiliary winding voltage $V_{a1\_max}$ at the maximum load current is taken as twice the maximum output voltage of an ideal transformer at maximum input voltage and no-load current, that is, $V_{a1\_max}=2V_{o2}/k$, to provide a reasonable design margin.

Components which are directly electrically connected to the auxiliary winding would need to have a voltage rating of at least $V_{a1\_max}$ in order to withstand the maximum auxiliary winding voltage that may occur during operations. For the example circuit of FIG. 1, the voltage rating of the power capacitor $C_a1$ and the switching controller SC1 would need to be at least $2N_rV_{o2}$ even though the supply voltage requirement $V_{SC}$ of the switching controller SC1 is only $N_rV_{o1}$ or $N_rV_{o2}/V_r$, where $N_r=1/k$ in this example. The design margin which is taken as two times the ideal maximum voltage is referred hereto as "double-voltage rule".

Therefore, where the SMPS is adapted to output voltage between a first, lower, voltage $V_{o1}$ and a second, higher, voltage $V_{o2}=V_rV_{o1}$, where $V_r$ is the ratio of $V_{o2}$ to $V_{o1}$, the auxiliary voltage $V_{aux\_0}$ at no load would vary between $N_rV_{o1}$ and $N_rV_{o2}$. The value of $N_rV_{o1}$ would need to be equal to or more than $V_{SC}$ so that the switching controller SC1 would be maintained to operate to its rated performance at the minimum output voltage or lower output voltage limit $V_{o1}$. For example, where the voltage output of an example SMPS is to vary between $V_{o1}=3.3V$ and $V_{o1}=20V$, $N_r$ would need to be 3 in order to supply a $V_{SC}$ of 10V. However, the power capacitor $C_a1$ and the switching controller SC1 would need to have a voltage rating or voltage tolerance of $2N_rV_{o2}$ in order to cater for possible maximum voltage due to voltage spikes etc. For the example with R=3, $V_{SC}=10V$ and $V_{o2}=20V$, the value of $2N_rV_{o2}$ or $2N_rV_rV_{o1}$ is 120V which means the voltage rating of the power capacitor $C_a1$ and the switching controller SC1 would need to be six times that of the maximum output voltage $V_{o2}$ or twelve times $V_{SC}$. It is trite that a component having a higher voltage rating is bulkier and more expensive than one having a lower voltage rating.

In order to mitigate the high voltage rating requirement of the switching controller SC1, a linear regulator is inserted between the power capacitor and the switching controller SC1 such that the voltage appearing at the power input terminal of the switching controller SC1 is stabilized at $V_{SC}$ by the linear regulator. However, the voltage difference between the output terminal of the diode $D_a10$ and the power input terminal of the switching controller SC1 is absorbed by the linear regulator which means power loss across the linear regulator. Furthermore, the addition of the linear regulator means additional component costs, additional spatial requirements and does not alleviate the higher voltage rating requirement of the power capacitor $C_a1$.

There is disclosed an example power switching apparatus comprises a power switch, a first capacitor, a second capacitor, a voltage converter and a switching controller; wherein the power switch comprises a control terminal and a switchable electrical link which is operable between an on-state and an off-state depending on the instantaneous signal level at the control terminal; wherein the voltage converter is a voltage regulator configured to receive a variable input voltage and to output a regulated output voltage; wherein the voltage converter is connected between the first capacitor and the second capacitor such that the first capacitor is subject to the variable input voltage and the second capacitor is subject to the regulated output voltage; and wherein the switching controller is configured to output a train of switching signals to the control terminal to switch the switchable electrical link repeatedly between an on-state and an off-state during operations.

In example embodiments, the first capacitor is an auxiliary capacitor and the second capacitor is a power capacitor.

The power switching apparatus may be connected with the power supply device to form a variable voltage output power supply to output power between a first voltage and a second voltage higher than the first voltage.

The auxiliary capacitor is to store power during the on-period to supply power to the switching controller during the off-period when the switching controller is in burst mode, which is also known as power skipping mode.

The energy stored on the auxiliary capacitor is to supplement the energy stored on the power capacitor during the on-period to supply power to maintain the switching controller in burst mode operation during the off-period of the burst mode.

The auxiliary capacitor is to subject to a variable input voltage and the variable input voltage follows the variable output voltage of the power supply.

The power capacitor is to subject to a regulated input voltage and the regulated input voltage is a voltage configured to maintain the switching controller in burst mode operation.

The power switching apparatus may be connected to a power supply device to form a switching-mode power supplying having a burst mode operation.

To facilitate connection to the power supply device, the voltage converter comprises an input terminal for connection to the power supply device and an output terminal for outputting power. The switching controller is connected to the output terminal of the voltage converter to obtain operational power from the voltage converter during operations. The power switch is operable by the switching controller to switch between a first switching state which is a low-impedance conductive state and a second state which is a high-impedance non-conductive state. The power switch is for connection to the power supply device such that when the power switch is turned on to operate in the conductive state, the power supply device is to supply operational power to the voltage converter, and when the power switch is turned off to operate in the nonconductive state, the power supply is not to supply operational power to the voltage converter. When in burst mode operations, the switching controller is to turned on the power switch for an on-period followed by an off-period, the on-period being substantially shorter than the off-period. The power switching apparatus comprises a power capacitor which is connected to the output terminal of the voltage converter. The power capacitor is charged up during the on-period to provide operation power to the switching controller during the on-period and the off-period following the on-period. The power switching apparatus comprises an auxiliary capacitor which is to provide supplemental energy to the power capacitor.

In this disclosure, power means electrical power, connection means electrical connection and potential means electrical potential, a link means and electrical link, contact means electrical contact, etc., unless the context requires otherwise or otherwise specifies.

FIGURES

Figure 2A:
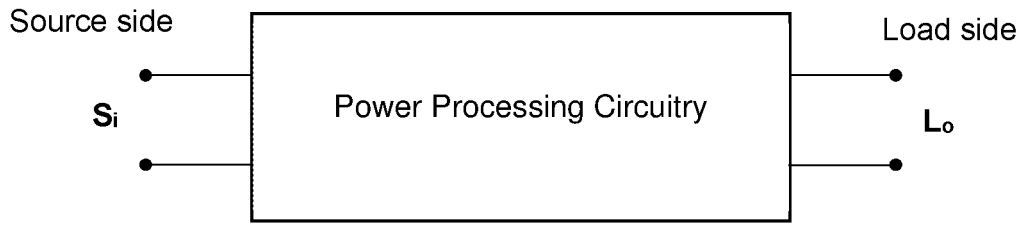
Figure 2B:
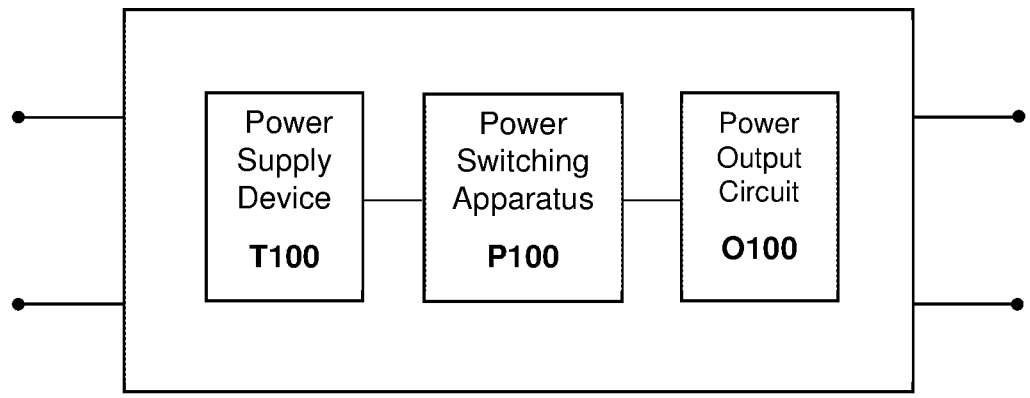
Figure 2C:
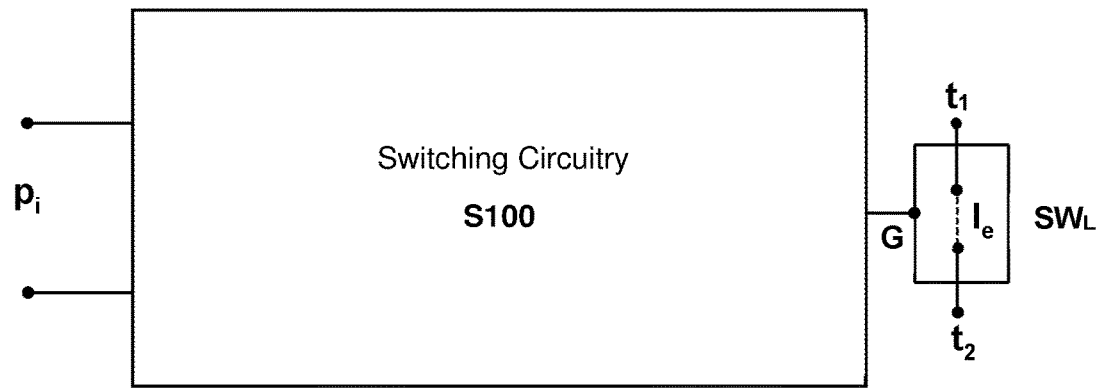
Figure 3:
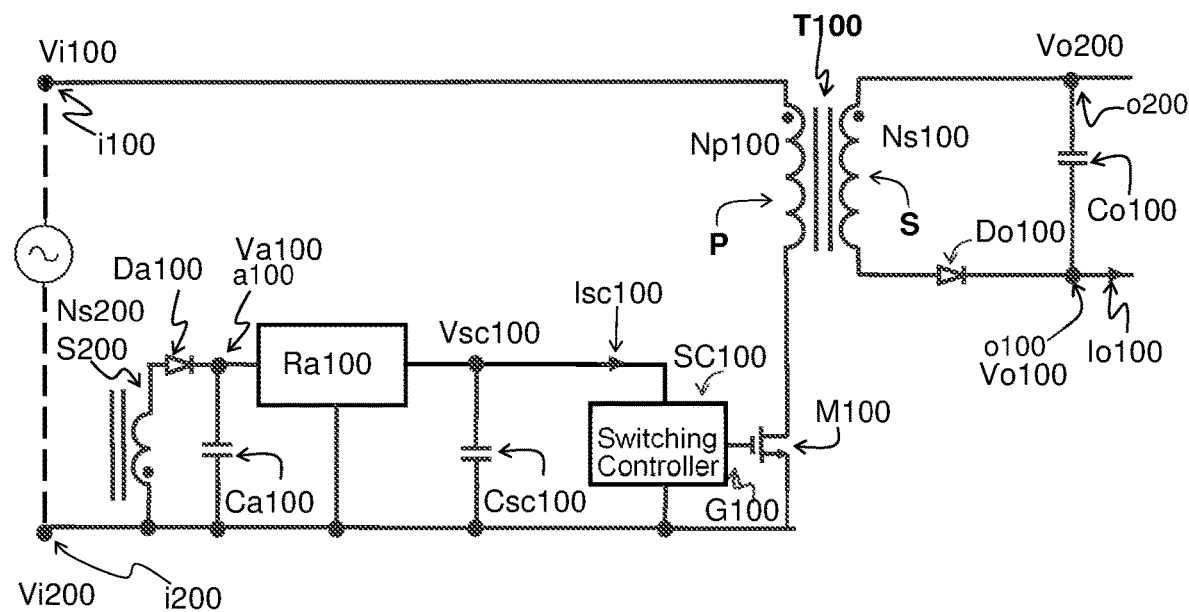
Figure 4:
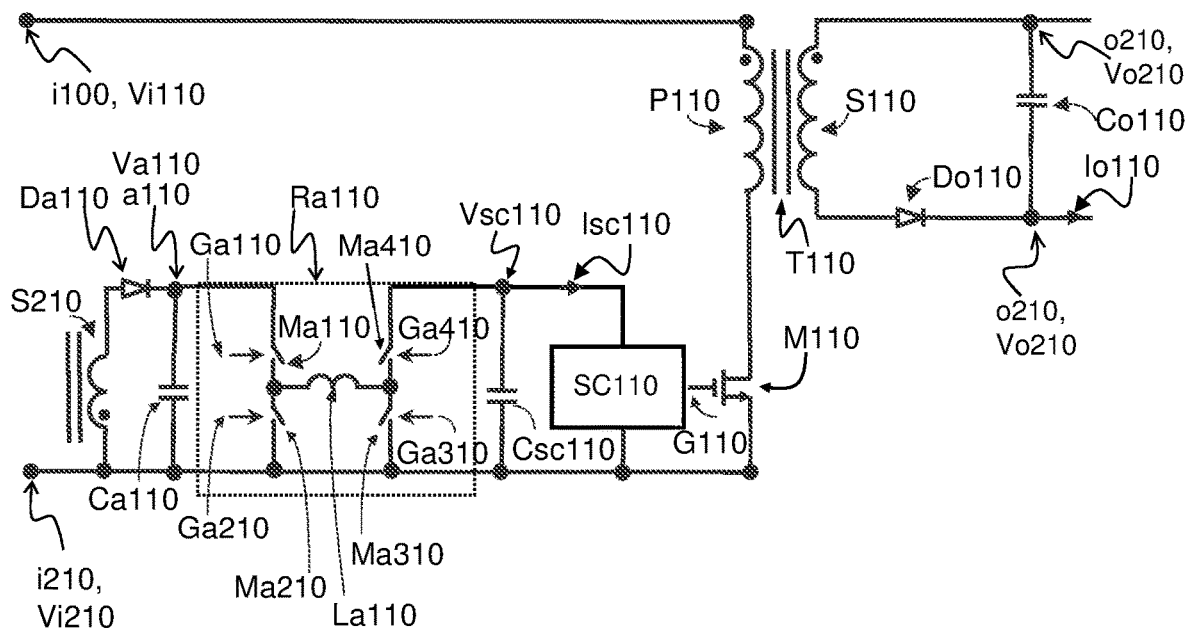
Figure 6A:
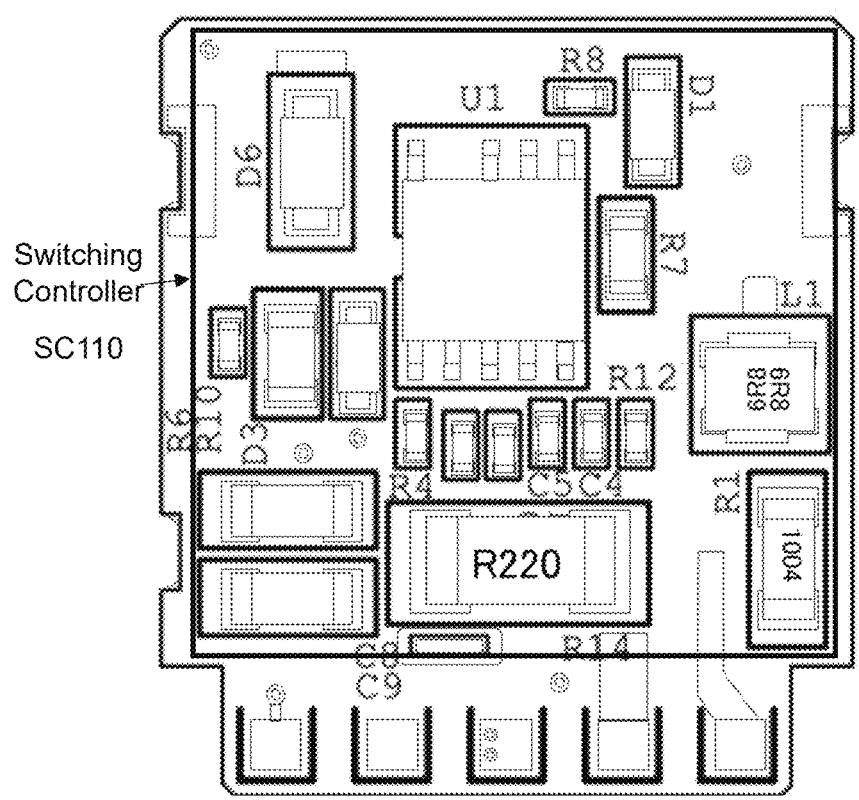
Figure 6B:
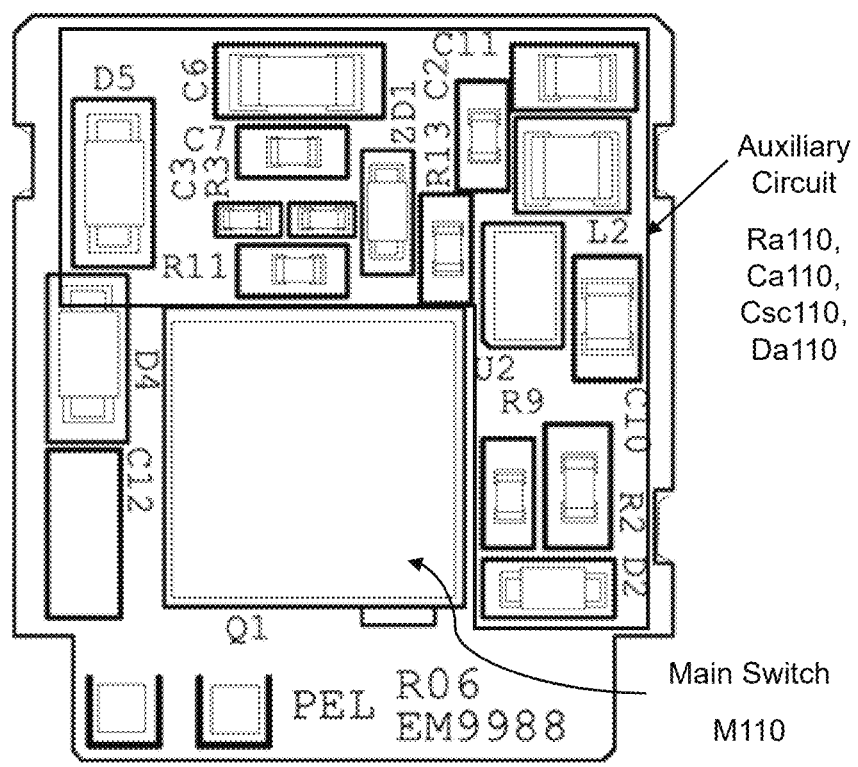

The present disclosure is described by way of example and with reference to the accompanying figures, in which:

FIG. 1 is a circuit diagram of an example switching-mode power supply,

FIG. 2A is a block diagram of an example power supply apparatus according to the present disclosure, FIG. 2B is a block diagram of an example power processing circuitry according to the present disclosure, FIG. 2C is a block diagram of an example power switching apparatus according to the present disclosure, FIG. 3 is an example circuit diagram of an example switching-mode power supply according to the present disclosure, FIGS. 3A1 to 3A5 are time diagrams of example operations of the power supply of FIG. 2 during an example burst mode, FIG. 4 is an example circuit diagram of an example switching-mode power supply incorporating an example voltage converter of the present disclosure, FIGS. 5A1 to 5A7 are time diagrams of example operations of the power supply of FIG. 4 during an example burst mode, and FIGS. 6A and 6B are elevation views of an example power switching module comprising an example power switching apparatus of the present disclosure.

DESCRIPTION

An example power supply apparatus 10 comprises an apparatus input (input in short), an apparatus output (output in short) and power processing circuitry interconnecting the apparatus input and the apparatus output, as depicted in FIG. 2A. The apparatus input defines a source side $S_i$ of the apparatus 10 which is an input side configured for making electrical connection with a power source whereby input electrical power is to be received from the power source for operation of the power processing circuitry and for outputting power to the power output. The apparatus output defines a load side $L_o$ of the apparatus 10 which is an output side configured for making electrical connection with a load whereby electrical power originating from the power source can be delivered to the load when the load is connected to the load side $L_o$. The input side of the power supply apparatus 10 is for connection to a power source (main power source) during power switching operations when electrical power is to be coupled from the source side to the load side or when a no-load voltage is to appear on the load side.

The example power processing circuitry comprises an example power supply device T100, an example power switching apparatus P100 and an example power output circuit O100, as shown in FIG. 2B.

The example power supply device T100 comprises a first winding, a second winding and a third winding which are in magnetic coupling. The first winding is a primary winding having a first plurality of windings $N_p$ 100, the second winding is a secondary winding having a second plurality of windings $N_S$ 100, and the third winding is another secondary winding which is configured as an auxiliary winding having a third plurality of windings $N_a$ 100.

The first winding is a power input winding comprising a first terminal which is a first end terminal of the first plurality of windings $N_p$ 100 and a second terminal which is a second end terminal of the first plurality of windings. The second winding is a power output winding comprising a first terminal which is a first end terminal of the second plurality of windings $N_S$ 100 and a second terminal which is a second end terminal of the second plurality of windings. The secondary winding is magnetically coupled to the primary winding, for example, by winding on a common magnetic core. The third winding is magnetically coupled to the secondary winding and comprises a third plurality of windings $N_a$ 100. The third winding is an auxiliary power winding comprising a first terminal which is a first end terminal of the third plurality of windings and a second terminal which is a second end terminal of the third plurality of windings. The first winding, the second winding and the third winding are wound on the magnetic core to form an example power transformer having six terminals. The first winding, the second winding and the magnetic core may be considered as cooperating to form a first power transformer. The second winding, the third winding, and the magnetic core may be considered as cooperating to form a second power transformer. In some embodiments, the second winding and the third winding may be wound on a second magnetic core while the first winding and the second winding are wound on a first magnetic core such that the first magnetic core forms a first magnetic path and the second magnetic core forms a second magnetic path which is different to the first magnetic path.

The first winding is configured as an input winding for connection to a power source. The second winding is configured as an output winding having an output for connection to an output circuit. The third winding is configured as an auxiliary winding for supplying operation power to the power switching circuit. The power source is an external power source, which may be a DC power source or an AC power source. The power source is a main power source which is to supply the operation power to the power supply apparatus 10 during power switching operations when the power supply apparatus 10 is connected to the power source.

The input winding, the auxiliary winding and the power switching apparatus are configured to cooperate to form a power input circuit and defining a power input side of the power supply apparatus 10. The second winding and the power output circuit are configured to cooperate to define a power output side of the power supply apparatus 10.

The power supply device T100 otherwise has same description as the example power supply circuit of FIG. 1 and the description thereon and in relation thereto is incorporated herein by reference and to apply mutatis mutandis where the context permits or requires.

The power switching apparatus P100 comprises a power input $P_i$, a switchable electrical link $SW_L$ and switching circuitry S100, as depicted in FIG. 2C.

The switchable electrical link $SW_L$ is operable in an on-state or in an off-state. When the electrical link $SW_L$ is in the on-state, the electrical link $l_e$ has a very low resistance and resembles the electrical properties of a current conductor so that the first terminal $t_1$ and the second terminal $t_2$ can be considered at the same electrical potential for most practical considerations. When the electrical link $SW_L$ is in the off-state, the electrical link $l_e$ has a very high resistance and has the electrical properties of an electrical insulator for most practical considerations.

The switching circuitry S100 is configured to transmit a train of switching signals to operate the switchable electrical link $SW_L$.

The power input $p_i$ is configured for connection to a power source whereby operation power for operating the switching circuitry S100 and the switchable electrical link $SW_L$ is received.

The switchable electrical link $SW_L$ comprises a first terminal $t_1$, a second terminal $t_2$ and an electrical link $l_e$ interconnecting the first terminal $t_1$ and the second terminal $t_2$.

The switchable electrical link $SW_L$ is configured and connected such that the primary winding is electrically connected or coupled to the power source when the electrical link $l_e$ is in the on-state and electrically disconnected or uncoupled from the power source when the electrical link $l_e$ is in the off-state. When the primary winding is electrically connected or coupled to the power source, electrical current flows from the power source to the primary winding, and the primary winding is in an on-state. When the primary winding is electrically disconnected or uncoupled the power source, electrical current cannot flow from the power source to the primary winding, and the primary winding is in an off-state.

The electrical link $1_e$ is switchable between the on-state and the off-state by application of switching signals to a control terminal G. When an on-signal appears at the control terminal G, the switchable electrical link $SW_L$ is in the on-state and when an off-signal appears at the control terminal G, the switchable electrical link $SW_L$ is in the off-state. By applying a train of switching signals comprising alternately disposed on-signals and off-signals, the switchable electrical link $SW_L$ will be repeatedly and alternately switched between the on-state and the off-state as described herein in relation to the power switch.

An example switchable electrical link $SW_L$ is realized in the example power switching apparatus P100 by means of a power switch as described herein. A power switch herein comprises a switchable electrical link $SW_L$ and a control terminal for controlling the operation state of the switchable electrical link $SW_L$.

In example applications, the switchable electrical link $SW_L$ is configured for connection in series with the input winding of a power supply device so that the input winding is switched on or switched off during power conversion operations, depending on the instantaneous operation state of the switchable electrical link $SW_L$.

The switching circuitry S100 is configured to generate a train of switching pulses to repeatedly switch the switchable electrical link $SW_L$ alternately between an on-state and an off-state during power switching operations. The switching circuitry comprises a switching signal output which is electrically connected to the control terminal of a power switch where the switchable electrical link $SW_L$ is a part, for example, an internal portion of the power switch.

Therefore, the power switching apparatus P100 comprises a power input $P_i$ for receiving operation power to operate the power switching apparatus P100, a switchable electrical link $SW_L$ to define the operation state of the power input winding, and switching circuitry S100 for switching the power input winding repeatedly and alternately between the on-state and the off-state.

An example power switching apparatus P100 comprises a power switch M100, a switching controller SC100, a capacitor $C_{SC}100$ and a voltage regulator $R_a100$, as depicted in FIG. 3. The switching controller SC100 is configured to operate in either a normal power delivery mode (during which the switching controller is to switch continuously, cycle by cycle) or a standby mode and the mode of operation of the switching controller SC100 is determined with reference to the output current requirement on the load side.

The example power switch M100 is an electronic power switch comprising a first terminal, a second terminal and a third terminal. The third terminal is a control terminal which is to switch or operate between a first switching state which is an on-state and a second switching state which is an off-state. When the third terminal is in the on-state, the power switch is in an on-state and a low-impedance electrical path is formed between the first terminal and the second terminal of the power switch. When the third terminal is in the off-state, the power switch is in an off-state and a high-impedance electrical path approximating an open-circuit is formed between the first terminal and the second terminal of the power switch. As the third terminal is to switch the power switch between an on-state and an off-state, the third terminal is also a switching terminal or a switching control terminal. The electrical path which is defined between the first terminal and the second terminal of the power switch M100 is a switchable electrical link $SW_L$ and the instantaneous operation state of this switchable electrical link $SW_L$ is determined by the state of the instantaneous control signal at the control terminal.

When the path between the first terminal and the second terminal is a high-impedance path having a high impedance approximating an open-circuit, the flow of operational current between the first terminal and the second terminal is impeded or effectively blocked. When the path between the first terminal and the second terminal is a low-impedance path having a low impedance approximating a short circuit, the path is a low-loss current path to facilitate flow of operational current between the first terminal and the second terminal with a very low voltage drop. The low-impedance path is a current path which is designed to permit passage of current through the power switch with a very low voltage difference between the first terminal and the second terminal. Power and current herein means electrical power and electrical current respectively unless otherwise specified and without loss of generality. In example embodiments such as the present, the power electronic switch is a semiconductor switch such as an integrated circuit MOSFET power switch. The example MOSFET switch has its drain configured and connected as the first terminal, its source configured and connected as the second terminal, and its gate configured and connected as the third terminal. The voltage difference between the first terminal and the second terminal of the example power switch during the on-state, or the on-state voltage drop, is at 0.2V or less, for example 0.1V or less, at the rated operational current. The power switch may be an insulated gate bipolar transistor (IGBT) or another type of semiconductor power switch.

In the example embodiments of FIG. 3, the example power switching apparatus is connected to the power supply circuit to form a switched-mode power supply ("SMPS"). A switched-mode power supply is also known as a switching-mode power supply, switch-mode power supply, switched power supply or switcher. An SMPS is a power supply apparatus which when connected to a power source is to operate to switch the source power of a power source to output a switched power output to the output side. The power source is typically a steady-state power source such as a DC source but can be an AC power source such as an AC source having a sinusoidal voltage waveform having a base frequency, for example 50 Hz or 60 Hz. The switched power output has a main frequency which is different to the main or nominal frequency of the power source. The main frequency of the switched power output is usually substantially higher than the base frequency. The main frequency of a switched power output is typically in the region of several kilohertz (kHz), several tens of kHz, several hundred kHz, or several megahertz (MHz).

During power conversion operations, the power switching apparatus P100 is powered to operate to facilitate switching of the primary winding repeatedly between an on-state and an off-state.

By alternately switching the primary winding between an on-state and an off-state during power switching operations, a switched power output will be generated on the output side of the power supply apparatus, when the input side comprising the primary winding, which is a power input winding, is connected to a power source.

The example power switching apparatus is for connection to the primary winding P, which is a power input winding, to facilitate power switching. To facilitate switched power conversion, the semiconductor power switch is connected to both the switching controller and the primary winding.

In example embodiments such as the present, the power switch is connected in series with the primary winding to form a primary circuit. The example primary circuit is a power input circuit comprising a first input terminal i100, a second input terminal i200 and a switchable winding interconnecting the first terminal i100 and the second terminal i200. The switchable winding is a switchable primary winding comprising the primary winding and switchable electrical link $SW_L$ in series connection with the primary winding. The switching controller is to operate to switch the primary winding between an on-state during which the resistance between the first terminal i100 and the second terminal i200 of the power supply apparatus 10 is very low and has a resistance value of a resistive short circuit and an off-state during which the resistance between the first and second terminals of the power supply apparatus is very high and has a resistance value of a resistive open circuit.

The first terminal i100 of the primary circuit is for connection to a first terminal of the power source and the second terminal i200 is for connection to a second terminal of the power source. When the power switch is in the on-state, the voltage drop across the primary winding is equal to the supply voltage $V_i$ of the power source minus the on-state voltage drop of the power switch, where $V_i = V_{i100} - V_{i200}$. When the power switch is in the off-state, the voltage drop across the power switch is approximately equal to the supply voltage $V_i$ of the power source.

In the example configuration of FIG. 3, the power switch M100 is connected downstream of the primary winding P. In this configuration, a first terminal of the primary winding P is electrically connected to the first terminal i100 of the power source via a first conductive bus, which is a forward bus, and the second terminal of the example primary winding P is electrically connected to the second terminal i200 of the power source via the switchable electrical link $SW_L$ of the power switch and a second conductive bus, which is a return bus. The switchable electrical link $SW_L$ has a first terminal which is electrically connected directly with the primary winding P and a second terminal which is electrically connected directly with the second terminal i200 of the power source via the return bus. When the first terminal of the primary winding P is electrically connected to the first terminal i100 of the power source via a first conductive bus, the first terminal of the primary winding P and the first terminal i100 of the power source are electrically connected directly and have the same electrical potential. When a plurality of terminals or nodes are electrically connected directly, a common electrical node having common electrical potential is formed. The forward bus is a conductor which is at same electrical potential as the first terminal i100 and provides another useful voltage reference for circuit operations. The return bus is a conductor which is at same electrical potential as the second terminal i200 and provides a useful voltage reference for circuit operations. In the example configuration, the first terminal and the second terminal of the primary winding P are respectively an upstream terminal and a downstream terminal, and the first node i100 is an incoming node and the second input node i200 is a return node.

In other example configurations, the power switch is connected upstream of the primary winding. When in such example configurations, the first terminal of the example primary winding P is connected to the first terminal of the power source via the switchable electrical path of the power switch, and the second terminal of the example primary winding P is electrically connected directly to the second terminal of the power source. The switchable electrical path of this primary circuit is formed when the first terminal of the example primary winding P is connected to the second terminal of the power switch, and with the first terminal of the power switch electrically connected directly with the first terminal of the power source.

The power switch is to operate to switch the primary winding between a first state which is an on-state and a second state which is an off-state. When the primary winding is in the on-state, a low impedance path comprising the primary winding and the power switch is formed. When the primary winding is in the on-state, a load-dependent current is to flow through the first winding and the current path defined by the power switch. When the primary winding is in the off-state, a high-impedance path comprising the primary winding and the power switch is formed between the first and second terminals i100, i200. When the primary winding is in the off-state, no operational current is to or can flow through the first winding or the path defined between the first terminal i100 and the second terminal i200 because of the high impedance of the path. Example switching controllers has a switching frequency of between several kHz to several tens or hundreds of kHz and several mega Hz.

The power input of the power switching apparatus P100 is for connection to a power source to obtain operation power for operation of the power switching apparatus P100.

The switching controller SC100 is to operate to generate a train of switching signals during power switching operations and the switching signals as control signals are to appear at a switching signal output terminal for output. The switching signals comprise on-pulses and off-pulses which are alternately disposed in the time domain such that an on-pulse immediately follows an off-pulse and an off-pulse immediately follows an on-pulse. By transmitting a train of control signals comprising switching signals which alternately and repeatedly change between an on-state and an off-state, and by connecting the switching signal output terminal to the switching terminal of the power switch, the power switch will be switched alternately and repeated between an on-state and an off-state. The frequency of the control signals determines the frequency of switching of the power switch and therefore the switching frequency of the primary circuit and the primary winding.

In some embodiments such as the present, the power switching apparatus P100 is to obtain operation power from the power supply circuit and the third winding is to function as an auxiliary winding for supplying operation power to operate the power switching apparatus. In the example power supply apparatus 10 of FIG. 2, the power switching apparatus 100 is connected to the third winding to obtain auxiliary operation power. To provide a regulated power for operation of the power switching circuit, the voltage regulator has a power input which is connected to the output of the third winding and a regulated voltage output which is connected to the switching controller.

The example switching controller SC100 comprises a power input terminal, a switching signal output terminal and a voltage reference terminal. The switching signal output terminal of the switching controller SC100 is connected to the control terminal G of the power switch M100 in order to control power switching operation of the power switch M100. The power input terminal is for connection to a power supply to obtain operation power and is at a supply voltage of Vsc100, the switching signal output terminal is to output a train of switching signals to operate the power switch, and the voltage reference terminal is connected to a return bus to provide a voltage reference for operation of the switching controller SC100.

The switching controller SC100 normally operates between a minimum voltage, say 10V, and a maximum voltage, say 25V at the power input terminal. An example switching controller may require a of minimum 0.5 mA at burst mode and around 10 mA at normal power delivery mode. The actual current required by the switching controller depends on the circuit design and switching frequency of the main converter.

In the example embodiment of FIG. 3, the switching controller SC100 is configured to obtain operation power from the main power source. More specifically, the switching controller SC100 is electrically connected to the auxiliary winding in order to obtain operation power from the main power source, which is the power source to supply output power to the output circuit and the load. In order to obtain operation power from the main power source while shielding the switching controller SC100 from direct exposure to the voltage fluctuations at the output of the auxiliary winding, for example, voltage fluctuations due to variable output voltage at the output circuit on the output side of the power supply apparatus 10, the switching controller SC100 is electrically connected directly to the auxiliary winding by means of the voltage regulator Ra100 so that electrical power is delivered to the switching controller SC100 after intermediate processing by the voltage regulator Ra100.

The voltage regulator Ra100 is configured to provide a stabilized power supply having a regulated voltage of $V_{SC}100$ to the switching controller SC100. The voltage regulator Ra100 is connected between the auxiliary winding S200 and the switching controller SC100 to provide stabilized supply power to the switching controller SC100. The voltage regulator Ra100 when connected is to isolate the power input terminal of the switching controller SC100 from the voltage fluctuation which is present at the output of the auxiliary winding as described herein.

The example voltage regulator Ra100 comprises an input terminal which is a variable voltage input terminal, an output terminal which is a regulated voltage output terminal and a voltage reference terminal. The input terminal of the voltage regulator Ra100 is connected to the output terminal of the auxiliary winding via a diode Da100, the output terminal of the voltage regulator Ra100 is connected to the power input terminal of the switching controller, and the voltage reference terminal is connected to a return bus of the power switching apparatus P100.

The diode Da100 as a one-way current device is configured to limit the flow of electrical power current only in a forward direction towards the voltage regulator Ra100, and to impede flow of current in the reverse direction which is opposite to the forward direction. The output node of the diode Da100 and the input node of the voltage regulator Ra100 is connected at an interconnection node a100 which is at a voltage of Va100.

A power storage capacitor is connected between the voltage regulator Ra100 and the switching controller SC100. The capacitor $C_{SC}100$ is a power capacitor which is configured to facilitate provision of operation power to the switching controller SC100 when no real-time power is available from the power source or from the auxiliary winding, for example, during the off-time period of a burst. The value of the power capacitor $C_{SC}100$ is selected such that the power stored in the power capacitor $C_{SC}100$ during the on-time period of a burst is sufficient to provide operation power during the off-time period of the burst so that the switching controller SC100 has operational power supply and is fully operational during the entire burst.

The capacitor $C_{SC}100$ is connected across the switching controller SC100 so that operation power is available to the switching controller SC100 during the entire burst mode period. In the example arrangement of FIG. 3, the positive terminal of the capacitor $C_{SC}100$ is connected with the power input terminal of the switching controller SC100 and the negative terminal of the capacitor $C_{SC}100$ is connected to the return bus, which is at same voltage as the return node i200. Since the voltage reference terminal of the switching controller SC100 is also connected to the return bus, the negative terminal of the capacitor $C_{SC}100$ and the voltage reference terminals of the switching controller SC100 and the voltage regulator Ra100 are at same electrical potential.

The power input terminal of the switching controller SC100 is connected to the regulated voltage output terminal of the voltage regulator Ra100 to obtain regulated voltage power to operate. The power input terminal of the switching controller SC100, the positive terminal of the capacitor $C_{SC}100$ and the regulated voltage output terminal of the voltage regulator Ra100 are electrically directly connected and having the same electrical potential whereby a common node is formed.

Since the power input terminal of the switching controller SC100 is electrically directly connected with the regulated voltage output terminal of the voltage regulator Ra100, the voltage appearing at the power input terminal and the positive terminal of the capacitor $C_{SC}100$ would be the regulated output voltage of the voltage regulator Ra100. Since the voltage regulator Ra100 is configured to supply operation power to the capacitor $C_{SC}100$, the voltage regulator Ra100 is typically selected such that its regulated output voltage $V_{dd}$ is equal to or comparable to the rated operation voltage of the capacitor $C_{SC}100$.

Furthermore, because the positive terminal of the capacitor $C_{SC}100$ and the power input terminal of the switching controller SC100 are tied to the same node, which is an output node of the voltage regulator Ra100, the voltage appearing at the positive terminal of the capacitor $C_{SC}100$ is always equal to the regulated output voltage of the voltage regulator Ra100. Therefore, the voltage rating of the capacitor $C_{SC}100$ can be selected with reference to the regulated output voltage, for example, at a value which is slightly higher than the regulated output voltage. Because the operation voltage of a switching controller is typically below 20V DC, and more typically at between 10V and 12V DC, the voltage rating requirement compared very favorably to that of the SMPS of FIG. 1 or other conventional switched power supplies.

In example embodiments such as the present, the example voltage regulator Ra100 is a step-up voltage regulator (step-up converter in short). When a step-up voltage converter is used, the minimum output voltage of the auxiliary winding can be set at the minimum operating voltage of the voltage regulator Ra100. For example, a step-up voltage converter, also known as a boost voltage convertor, having an output voltage suitable for operation of a switching controller SC100 can have a minimum expected input voltage $V_{i\_min}$ of about 1V. Where the output voltage of the power supply apparatus 10 is variable between a first, lower, voltage $V_{o1}$ and a second, higher, voltage $V_{o2}$, where $V_{o2}=V_r V_{o1}$ and $V_r$ is the ratio between $V_{o2}$ and $V_{o1}$, the minimum and maximum expected voltage at the auxiliary winding output are, respectively, $N_r V_{o1}$ and $N_r V_{o2}$, where $N_r$ is the turn ratio between the number of turns of the auxiliary winding and the number of turns of the output winding. For example, where the power supply apparatus 10 is to output a voltage which is variable between $V_{o1}=3.3V$ and $V_{o2}=20V$, and with $N_r=3$ as the above example, the minimum and maximum expected voltage at the auxiliary winding output are, respectively, $N_r V_{o1}$=10 V and $2N_r V_{o2}$=120V.

However, when a step-up voltage converter is deployed, the minimum expected voltage at the auxiliary winding can be selectively set at or slightly higher than the minimum voltage requirement of the voltage converter.

For example, where the minimum voltage requirement of the step-up voltage converter $V_{SC\_min}$ is 1V, the turns ratio $N_r$ can be selected as 1/3.3=0.33 in which case the voltage output at the auxiliary winding output would vary between a minimum voltage $V_{aux\_min}$ of 1V and a maximum voltage $V_{aux\_max}$ of 12V, applying the double-voltage rule.

Where the minimum voltage requirement of the step-up voltage converter $V_{SC\_min}$ is 2V or where the minimum voltage requirement of the step-up voltage converter is less than 2V but a slightly higher minimum output voltage of the auxiliary winding is selected to provide an additional operation margin, a higher turns ratio of 2/3.3 may be selected so that the minimum output voltage of the auxiliary winding will be 2V. When the minimum output voltage of the auxiliary winding is at 2V, the maximum output voltage $V_{aux\_max}$ of the auxiliary winding due to transformer imperfection would be 24V, applying the double-voltage rule. This maximum output voltage $V_{aux\_max}$ is substantially lower than that of the SMPS of FIG. 1 and is highly advantageous.

When a step-up voltage converter is used to supply operation power of the switching controller SC100, the minimum auxiliary voltage output can be lower than the operating voltage $V_{SC}$ of the switching controller SC100, so that the winding ratio $N_r$=$N_a/N_s$ between the number of turns of the auxiliary winding to output winding can be smaller than the voltage ratio $V_{SC}/V_{o1}$. For example, the winding ratio can be 0.33 when the minimum voltage requirement $V_{VR\_min}$ of the step-up voltage converter is 1V, which is ten times less than the ratio of 3.3 of the apparatus of FIG. 1. when the minimum voltage requirement $V_{VR\_min}$ of the step-up voltage converter is 2V, the winding ratio can be 0.66, which is five times less than the ratio of 3.3 of the apparatus of FIG. 1 when using the same switching controller SC100 having the same operation voltage requirement $V_{SC}$. The relationship between the winding ratio, the minimum voltage requirement $V_{VR\_min}$ of the step-up voltage converter and the minimum output voltage requirement $V_{o1}$ or $V_{o\_min}$ can be expressed in an equation form as: $N_r$=$V_{VR\_min}/V_{o\_min}$. Where $V_{o\_min}$ is higher than or equal to $V_{VR\_min}$, the winding ratio $N_r$ can be at one or less than one, such that the auxiliary winding has a smaller number of turns than the secondary winding and this would result in a smaller auxiliary winding and a smaller and more economical power supply device.

The switching controller SC100 comprises a "burst mode" terminal and a monitoring circuit to continuously monitor the "burst mode" terminal and determine whether a "burst mode" signal is detected at the "burst mode" terminal. A current sensor is disposed on the load side of the power supply apparatus 10 to facilitate detection of load current on the load side. The current sensor has a sensor output which is connected to the "burst mode" terminal. The switching controller SC100 is configured to enter into burst mode operation when the power supply apparatus 10 is connected to an active power source and there is no load current detectable on the load side. A no load current condition is usually not an absolute zero current condition but may be a condition under which there is a small current flow due to for example, leakage, parasitic, etc. The switching controller SC100 is configured to enter into normal power delivery mode operation when the power supply apparatus 10 is connected to an active power source and load current at or above the threshold load current is detected on the load side.

When the power supply apparatus 10 is connected to a power source, the switching controller SC100 is to enter into power switching operations and to determine whether a "no load current" condition on the load side is detected. When a no-load condition is detected, the switching controller SC100 is to enter into the burst mode operation.

When in burst mode operations, the switching controller SC100 is to generate a train of switching signals during an active period between $t_{00}$ and $t_{01}$, which is known as on-time, and to stay idle for an inactive period between $t_{01}$ and $t_{02}$, which is known as off-time, and then to generate another train of switching pulses for another active period immediately after the end of the inactive duration at $t_{02}$, as depicted in FIG. 3A1. During the off-time duration, no switching signals are generated. The on-time is usually shorter than the off-time in order to achieve meaningful power-saving. For example, the on-time may be a small fraction of the off-time or a small fraction of a burst cycle comprising an active period and an immediately following inactive period. A burst cycle herein may consist of one period of on-time and one period of off-time immediately following the on-time, or one period of off-time and one period of on-time immediately following the off-time. The fraction may be 20%, 15%, 10%, 5%, or less, and a range of ranges selected from any of the aforesaid values. For example, the on-time ratio may be at 50% at an output current equal to 5% of $I_o$ and drops to 10% when the output current is at 5% of $I_o$. The train of switching signals when applied at the control terminal of the power switch will result in a corresponding train of switched voltages, as shown in FIG. 3A2. A switched voltage herein is a voltage measured across the switchable link $SW_L$ of the power switch M100. The switching signal and the switched voltage are out-of-phase, or more specifically anti-phase, in this example, as shown in FIGS. 3A1 and 3A2, such that when the switching signal is at a high level, the switched voltage is at a low level. A high level herein means a voltage which is equal to the supply voltage of the main power source and a low level herein means a voltage which is equal to the reference potential, which is the potential at the first terminal $V_t$100 of the main power source. The reference potential at the first terminal $V_t$100 of the main power source is set as zero or ground potential of the power supply apparatus 10 as a matter of convention or convenience. The term equal herein includes approximately equal to unless the context otherwise requires. Depending on the type of power switches, the switching signal and the switched voltage can be out-of-phase or in-phase without loss of generality.

As a result of repeated switching of the power switch, or more specifically the switching of the switchable link $SW_L$, by the switching signals during the burst mode operation of the switching controller SC100, a burst mode auxiliary power will appear at the auxiliary output of the auxiliary winding. The burst mode auxiliary power consists of burst power cycles each consisting of a burst of switched power followed by a period of power silence. The burst of switched power, or power burst in short, comprises a train of switched power pulses extending for a period which is referred to as an on-time or an on-period. There is no power output at the auxiliary output during the period of power silence, which is a power-off period or off period in short. The power-off period occurs during an off-time of the power burst. No power output at the auxiliary output herein means a condition when no power of meaningful significance in relation to the operation of the switching controller SC100 is present at the auxiliary output. A no power output condition can be determined with reference to a threshold power level such that when no power at or above the threshold power output level is detected, a no power condition is determined as present.

The on-time of the power burst coincides with the on-time of the burst cycle of the switching controller SC100 and the off-time of the power burst coincides with the off-time of the burst cycle of the switching controller SC100. The duration of a power burst is also equal to the duration of the burst cycle of the switching controller SC100 for practical considerations. Each example power burst comprises a plurality of power pulses and each power pulse has a voltage swing and swings between a negative voltage and a positive voltage, as depicted in FIG. 3A3.

In example embodiments, the capacitance value of the power capacitor $C_{SC}100$ and the on-time or on-duration of the burst cycle are selected such that the power capacitor is charged up during the on-time and so that the energy stored during the on-time charging is sufficient to maintain the switching controller SC100 in an operational state during the off-time of the burst cycle. To maintain the switching controller SC100 in an operational state, the voltage $V_{SC}100$ at the power input terminal is always maintained at or above the supply voltage requirement $V_{SC}$ of the switching controller SC100.

In example embodiments such as the present, an optional auxiliary capacitor $C_a100$ is connected intermediate the voltage regulator Ra100 and the auxiliary winding output. During a burst cycle, energy delivered by the axillary winding during the on-time will charge up the auxiliary capacitor $C_a100$ such that the energy stored in the auxiliary capacitor $C_a100$ as a result of charging during the on-time of the burst cycle is sufficient to power the operation of the voltage regulator Ra100 and the switching controller SC100 during the off-time.

The auxiliary capacitor $C_a100$ has a first terminal which is connected to the output terminal of the diode $D_a100$ and a second terminal which is connected to the return bus, as shown in FIG. 3. During the on-time of the burst cycle, the auxiliary capacitor $C_a100$ is charged up, preferably fully charged up, as depicted in FIG. 3A4. The energy stored in the auxiliary capacitor $C_a100$ is then transferred to the power capacitor $C_{SC}100$ through the voltage regulator Ra100.

In example embodiments such as the present, the energy stored in the auxiliary capacitor $C_a100$ is rapidly transferred to the power capacitor $C_{SC}100$, preferably immediately at the end of the on-time of the burst cycle. To facilitate a rapid transfer of stored energy from the auxiliary capacitor $C_a100$ to the power capacitor $C_{SC}100$, with the voltage regulator Ra100 disposed in series between the auxiliary capacitor $C_a100$ to the power capacitor $C_{SC}100$, a voltage regulator Ra100 comprising a switching converter would be useful. Since energy is transferred from the auxiliary capacitor $C_a100$ to the power capacitor $C_{SC}100$ at beginning of the off-time, the auxiliary capacitor $C_a100$ does not need to store enough energy for operation of the switching controller SC10 during the off-time of the burst cycle, a capacitor having a substantially or significantly smaller capacitance that that of $C_a1$ of FIG. 1 can be used. In general, the power capacitor $C_{SC}100$ would need to be large enough to store energy during the off-time such that the voltage of $C_{SC}100$ would not drop below the minimum operating voltage of the Switching Controller. The auxiliary capacitor $C_a100$ is optional. An auxiliary capacitor $C_a100$ having a small capacitance value would help smoothen the input voltage to the voltage converter Ra100 so that the voltage converter can operate more effectively to pump energy to $C_{SC}100$ during the on-time.

In example embodiments such as the present, the voltage converter has a switching frequency which is much higher than the switching frequency of the switching controller SC100. A voltage converter $R_a100$ having a substantially higher switching frequency than the switching controller SC100, which is a main converter, will operate to ensure that when the voltage pulse at S200 is positive, the voltage converter $R_a100$ will operate to pump energy to the power capacitor $C_{SC}100$. In general, if the voltage converter $R_a100$ has a higher switching frequency than the switching controller SC100, more cycles of energy pumping can be performed during the on-time of the power-skip mode. The switching frequency of voltage converter $R_a100$ is preferably higher than the switching frequency of the main converter SC100. With a higher switching frequency, the voltage converter Ra100 will operate to pump energy to the power capacitor $C_{SC}100$ whenever the voltage pulse at S200 is positive. If the switching frequency of Ra100 is substantially higher than main converter, more number of pumping can be made during the positive pulse and more secure to pump enough energy to Csc100. For example, the switching frequency of the voltage regulator Ra100 may be 1, 2, 3, 4, 5, 6, 7, 8, 9, or 10 times, 20 times, 100 times higher than the switching frequency of the switching controller SC100. In some embodiment, the switching frequency of the switching controller SC100 and the switching frequency of the voltage converter $R_a100$ may be equal or comparable without loss of generality.

With a rapid transfer of stored energy from the auxiliary capacitor $C_a100$ to the power capacitor $C_{SC}100$, the voltage $V_{SC}100$ at the power input terminal of the switching controller SC100, which is equal to the regulated output voltage $V_{dd}$ of the voltage regulator Ra100, is always at or above the supply voltage requirement $V_{SC}$ of the switching controller SC100, as depicted in FIG. 3A5.

Although the description herein is with respect to a variable output voltage power supply, the power switching apparatus and power supply apparatus of FIG. 3 is suitable for use with a power supply having a fixed output voltage without loss of generality.

Where the power supply apparatus is configured for variable output voltage, the auxiliary output voltage can be higher than the supply voltage requirement $V_{SC}$ of the switching controller SC100. For example, where the power supply apparatus is for supplying a variable output voltage between 3.3V and 20V, and the supply voltage requirement $V_{SC}$ is 10V, the step-up voltage regulator Ra100 may be turned off when the auxiliary output voltage is at or above the supply voltage requirement $V_{SC}$ so that the switching controller SC100 is to receive operational power directly from the auxiliary output after passing through the optional diode.

The voltage regulator Ra100 may be a step-up and step-down voltage converter. When a step-up and step-down voltage converter is used to provide a regulated voltage output to operate the switching controller SC100, the voltage regulator Ra100 will operate as a step-up voltage converter when the auxiliary output voltage is higher than the supply voltage requirement $V_{SC}$ and as a step-down voltage converter when the auxiliary output voltage is lower than the supply voltage requirement $V_{SC}$. In some embodiments, the voltage regulator Ra100 may turn off when the auxiliary output voltage is within an allowable operation voltage range of the supply voltage requirement $V_{SC}$ so that the switching controller SC100 and the power capacitor $C_{SC}100$ can receive power from the auxiliary power output without going through the voltage regulator Ra100.

Where the operation voltage range of the switching controller SC100 is between a lower limit $V_{SC\_min}$, and an upper voltage limit $V_{SC\_max}$, the voltage at the power input terminal of the switching controller SC100 should be maintained in a range defined by the lower and upper voltage limits $V_{SC\_min}$ and $V_{SC\_max}$ without loss of generality.

The current I of a capacitor having a capacitance value C is related to the rate of change of voltage by the relationship $$I = C\frac{dV}{dt}.$$

Where the voltage at me power input terminal of the switching controller SC100 is to change from the upper voltage limit $V_{SC\_max}$ to the lower voltage limit $V_{SC\_min}$ during off-time $T_{off}$, such that $dV=V_{SC\_max}-V_{SC\_min}$ and $dt=T_{off}$, the capacitance of the power capacitor $C_{SC}100$ required would depend on the operational current requirement of the switching controller SC100.

For example, where the operational current $I_{SC}100$ of the switching controller SC100 is 1 mA, the off-time of the burst cycle is 10 ms and dV=10V, the power capacitor $C_{SC}100$ should have a capacitance of 1 uF or more and a voltage rating of 25V to cater for the maximum voltage of 20V. Apart from the specific features described herein with reference to the apparatus of FIG. 3, the component and features of the apparatus of FIG. 1 that are also present in the apparatus of FIG. 3 have the same function, inter-relationship and purposes, and the description in relation to the components and features are incorporated herein by reference and to apply mutatis mutandis unless the context requires otherwise.

An example power supply apparatus 20 comprising an example step-up and step-down voltage converter Ra110 is depicted in FIG. 4.

The voltage converter Ra110 comprises a switching bridge having a first switching branch, a second switching branch and an inductor La110 interconnecting the first and second switching branches. The first switching branch comprises a first power switch Ma110 and a second power switch Ma210 which are connected in series. The second switching branch comprises a first power switch Ma410 and a second power switch Ma310 which are connected in series. Power switches are connected in series herein when their switchable electrical links are connected in series. The inductor La110 has a first terminal connected to a junction node interconnecting the first and second power switches of the first switching branch and a second terminal connected to a junction node interconnecting the first and second power switches of the second switching branch. The power switch Ma110 has control terminal Ga110, the power switch Ma210 has control terminal Ga210, the power switch Ma310 has control terminal Ga310, and the power switch Ma410 has control terminal Ga410, as depicted in FIG. 4

The first switching branch has a first terminal which is connected to the output terminal of the diode Da110 and a second terminal which is connected to the return bus. The first terminal is a higher potential terminal which is at same potential as the terminal of the switchable electrical link of the first power switch and which is distal to the junction node of the first switching branch. The second terminal is a lower potential terminal which is at same potential as the terminal of the switchable electrical link of the second power switch and which is distal to the junction node of the first switching branch.

The second switching branch has a first terminal which is connected to the power input terminal of the switching controller SC110 and a second terminal which is connected to the return bus. The first terminal is a higher potential terminal which is at same potential as the terminal of the switchable electrical link of the first power switch and which is distal to the junction node of the second switching branch. The second terminal is a lower potential terminal which is at same potential as the terminal of the switchable electrical link of the second power switch and which is distal to the junction node of the second switching branch.

During operations, when a first diagonal pair of power switches comprising power switches Ma110 and Ma310 is turned on and a second diagonal pair of power switches comprising power switches Ma210 and Ma410 is turned off, the voltage converter Ra110 enters into an energizing cycle Da1 and the inductor La110 will be energized by the auxiliary power output. When the second diagonal pair of power switches comprising power switches Ma210 and Ma410 is turned on and the first diagonal pair of power switches comprising power switches Ma110 and Ma310 is turned off, the energized inductor La110 will be deenergized, the voltage converter Ra110 enters into an deenergizing cycle Da2 and the inductor current is discharged from the inductor La110 to the switching controller SC110. In addition to the energizing and deenergizing cycles, there may be an idling cycle. When in the idling cycle, at least three or all of the four power switches are turned off and the inductor current will keep flowing inside the switching bridge, and more specifically, flowing through the body diodes of the turned-off power switches.

For example, when the voltage converter Ra110 is to transition from an energized state when the inductor La110 is fully energized to an deenergized state when the energized inductor La110 is to be deenergized, the voltage converter Ra110 may enter a transition cycle $D_{idle\_1}$. When in the first idling cycle, the voltage converter Ra110 is in a first idling state during which three of the power switches Ma310, Ma210, Ma410 are turned off so as not to energize the inductor La110 by the auxiliary output. When in the first idling state, the inductor current will keep flowing through the body diodes of diagonal switches Ma210 and Ma410.

Likewise, the voltage converter Ra110 may enter a second idling cycle $D_{idle\_2}$ when the voltage converter Ra110 is to transition from the deenergized state to the energizing state. When in the second idling cycle, the voltage converter Ra110 is in a second idling state and three of the power switches Ma110, Ma210, Ma310 are turned off so that the inductor La110 is not energized by energy available at the power input terminal Vsc110.

The average current which is to flow from the inductor La110 to the power capacitor $C_{SC}110$ and the average current which is to flow from the auxiliary power output to the inductor La110 can be equalized by adjusting and/or selecting the duty cycle parameters Da1, Da2, $D_{idle\_1}$ and $D_{idle\_2}$ and the total repetition time and cycles without loss of generality.

Each of the duty cycle parameters Da1, Da2, $D_{idle\_1}$ and $D_{idle\_2}$ can be varied between 0 and 1 and the repetition time can be adjusted to cater for different loading and operation conditions, although the total repetition time, which is a repetition time determined by the switching frequency of the bridge configuration or each one of the switches Ma110 or Ma210 or Ma310 or Ma410, should be smaller than the switching period, which is a time period determined by the switching frequency of the main converter or the switching frequency of the main switch M110 during burst mode operation.

In example embodiments such as the present, the voltage converter Ra110 does not require an idling state so that the switching bridge is to switch alternately between the energizing state and the de-energizing state.

In addition, there is no need for the auxiliary switching converter (which is the switching bridge of Ra110) to run with much higher frequency than the main switching converter all the time during the burst period and the idle period. For example, the auxiliary switching converter can stop running or run at a lower frequency during the idle period, so the average switching frequency of the auxiliary switching converter will be lower that the switching frequency at burst period. If a larger enough capacitor Ca110 is employed, voltage across capacitor Ca110 will be sustained across the idle period, than the switching frequency of the auxiliary switching converter can be set at a lower value at all time. Nevertheless, a larger Ca110 is preferred. The average switching frequency of the auxiliary switching converter can be lower than the main switching converter so as to reduce switching losses in the auxiliary switching converter to improve overall efficiency.

The power switching apparatus of FIG. 4 is otherwise identical to that of FIG. 3 and the description on and in relation to the power switching apparatus of FIG. 3 is incorporated herein by reference. In addition, the timing FIGS. 5A1 to 5A5 correspond to the timing FIGS. 3A1 to 3A5, the description thereon and in relation thereto is incorporated herein by reference and to apply mutatis mutandis without loss of generality.

The power switching apparatus may be configured as a power switching module, as depicted in FIGS. 6A and 6B. The power switching apparatus is for an example a 60 W power supply and such a miniaturized module is an impressive achievement.

While the present disclosure has been with reference to examples and embodiments, the examples and embodiments are only for reference and should not be used to construe to restrict the scope of disclosure. For example, while the power switching apparatus is described with reference to a 3-winding transformer, the power switching apparatus can be used with other types of power supply devices without loss of generality.

The invention claimed is:

1. A power switching apparatus for a switching-mode power supply, comprising a power switch, a switching controller, a voltage converter and a power capacitor;
   wherein the power switch is configured for connection with a power input device to form a power supply circuit to receive power from a power source;
   wherein the switching controller is operable to turn on or turn off the power switch, wherein when the power switch is turned on, power is to flow from the power source into the power input device, and wherein when the power switch is turned off, power is to stop flowing from the power source into the power input device;
   wherein the voltage converter is configured to receive power from the power source when the power switch is turned on and to output a regulated voltage;
   wherein the power capacitor is configured to be charged by the regulated voltage of the voltage converter when the power switch is turned on;
   wherein the power capacitor is configured to discharge to provide power for operation of the switching controller when the power switch is turned off; and
   wherein the power capacitor has a capacitance which is adapted to store energy during the on-period of a burst cycle and the energy stored during the on-period is sufficient to maintain operation of the switching controller during the off-period of a burst cycle.

2. The power switching apparatus according to claim 1, wherein the voltage converter is configured for variable voltage input and regulated voltage output, the switching controller comprises a power input node, and the power capacitor comprises a positive terminal; and wherein the regulated voltage output, the power input node and the positive terminal of the power capacitor are connected at a common node and at same electrical potential.

3. The power switching apparatus according to claim 1, wherein the switching controller is configured to be operable in a burst mode during which the switching controller is to operate in an on-period and an off-period which is longer than the on-period is in abutment therewith; wherein the switching controller is configured to receive operation power from the power supply circuit and to transmit a train of switching signals comprising a plurality of alternately disposed on-signals and off-signals to the power switch during the on-period; wherein the switching controller is configured to stop transmitting on-signals to the power switch during the off-period; wherein the switching controller is configured to receive operation power from the power capacitor through discharge of the power capacitor; and wherein the operation power from the power capacitor is due to charging of the power capacitor by the power source during the on-period.

4. The power switching apparatus according to claim 1, wherein the apparatus comprises power-input nodes for making electrical connection to the power source and a diode connected to a voltage input terminal of the voltage converter, and wherein the diode has a forward end connected with the voltage converter and a rear end connected to the input terminal.

5. The power switching apparatus according to claim 1, wherein the voltage converter is a step-up voltage converter.

6. The power switching apparatus according to claim 1, wherein the voltage converter comprises an inductive switching bridge which is to switch to receive power from the power source at one instant and which is to output power to the switching controller after the one instant.

7. The power switching apparatus according to claim 1, wherein the power capacitor has a capacitor voltage rating and the switching controller has a switching controller voltage rating, and wherein the capacitor voltage and the switching controller voltage rating are comparable.

8. The power switching apparatus according to claim 1, wherein the apparatus comprises an auxiliary capacitor, the auxiliary capacitor having a first terminal connected to a power input of the voltage converter and a second terminal connected to a return bus; and wherein the voltage converter and the auxiliary capacitor are configured such that the voltage converter is to operate to transfer energy stored on the auxiliary capacitor during the on-period to the power capacitor.

9. The power switching apparatus according to claim 8, wherein the auxiliary capacitor is to store energy during the on-period such that the energy stored on the auxiliary capacitor during the on-period is sufficient to maintain operation of the switching controller during the off-period.

10. The power switching apparatus according to claim 8, wherein the auxiliary capacitor has a capacitance value smaller than the capacitance value of the power capacitor, and wherein the capacitance of the auxiliary capacitor smaller than the capacitance value of the power capacitor by 100%, 80%, 60%, 40% 20% or more, or a range or ranges selected from any of the aforesaid values.

11. The power switching apparatus according to claim 8, wherein the auxiliary capacitor has a voltage rating equal to or smaller than the voltage rating of the switching controller.

12. The power switching apparatus according to claim 8, wherein voltage converter comprises a switching circuit which is to transfer energy from the auxiliary capacitor to the power capacitor.

13. The power switching apparatus according to claim 1, wherein the switching controller is configured to operate to generate a train of switching signals during power switching operations, and wherein the train of switching signals has a first switching frequency and the voltage converter has a second switching frequency which is higher than the first switching frequency.

14. A switched mode power supply comprising a switching apparatus, wherein the switching apparatus comprises a power switch, a switching controller, a voltage converter and a power capacitor;
- wherein the power switch is configured for connection with a power input device to form a power supply circuit to receive power from a power source;
- wherein the switching controller is operable to turn on or turn off the power switch, wherein when the power switch is turned on, power is to flow from the power source into the power input device, and wherein when the power switch is turned off, power is to stop flowing from the power source into the power input device;
- wherein the voltage converter is configured to receive power from the power source when the power switch is turned on and to output a regulated voltage;
- wherein the power capacitor is configured to be charged by the regulated voltage of the voltage converter when the power switch is turned on;
- wherein the power capacitor is configured to discharge to provide power for operation of the switching controller when the power switch is turned off;
- wherein the switching controller is configured to be operable in a burst mode during which the switching controller is to operate in an on-period and an off-period which is longer than the on-period is in abutment therewith;
- wherein the switching controller is configured to receive operation power from the power supply circuit and to transmit a train of switching signals comprising a plurality of alternately disposed on-signals and off-signals to the power switch during the on-period;
- wherein the switching controller is configured to stop transmitting on-signals to the power switch during the off-period; wherein the switching controller is configured to receive operation power from the power capacitor through discharge of the power capacitor; and
- wherein the operation power from the power capacitor is due to charging of the power capacitor by the power source during the on-period.

15. The switched mode power supply according to claim 14, wherein the switched mode power supply comprises a power supply device which comprises an input winding, an output winding and an auxiliary winding, and wherein the switching apparatus has a power input which is connected to the auxiliary winding to receive operation power therefrom, and a switchable electrical link through the power switch is connected in series with the input winding.

16. The switched mode power supply according to claim 15, wherein the auxiliary winding has a smaller number of turns than the output winding.

17. The switched mode power supply according to claim 14, wherein the switched mode power supply is configured for variable voltage output for supplying power between a first output voltage and a second output voltage which is higher than the first output voltage.

18. The switched mode power supply according to claim 17, wherein the first output voltage is below operating voltage of the switching controller.

19. The switched mode power supply according to claim 17, wherein the voltage converter is a step-up voltage converter which is to turn off when output voltage of the auxiliary winding is at or above operating voltage of the switching controller.

20. The switched mode power supply according to claim 14, wherein the power capacitor has a capacitance which is adapted to store energy during the on-period of a burst cycle and the energy stored during the on-period is sufficient to maintain operation of the switching controller during the off-period of a burst cycle.

\* \* \* \* \*